(12) United States Patent
Moriguchi (10) Patent No.: US 11,982,531 B2
(45) Date of Patent: May 14, 2024

(54) VIBRATION-TYPE ANGULAR VELOCITY SENSOR

(71) Applicant: Sumitomo Precision Products Co., Ltd., Amagasaki (JP)

(72) Inventor: Takafumi Moriguchi, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 114 days.

(21) Appl. No.: 17/913,511

(22) PCT Filed: Jul. 16, 2020

(86) PCT No.: PCT/JP2020/027630
§ 371 (c)(1),
(2) Date: Sep. 22, 2022

(87) PCT Pub. No.: WO2021/192336
PCT Pub. Date: Sep. 30, 2021

(65) Prior Publication Data
US 2023/0140998 A1    May 11, 2023

(30) Foreign Application Priority Data
Mar. 24, 2020    (JP) .................................. 2020-052432

(51) Int. Cl.
*G01C 19/5776*    (2012.01)
(52) U.S. Cl.
CPC ............................... *G01C 19/5776* (2013.01)

(58) Field of Classification Search
CPC ............ G01C 19/5776; G01C 19/5755; G01C 19/5726
See application file for complete search history.

(56) References Cited

FOREIGN PATENT DOCUMENTS

JP    2009-115559 A    5/2009

OTHER PUBLICATIONS

International Search Report (PCT/ISA/210) issued in PCT Application No. PCT/JP2020/027630 dated Aug. 18, 2020 with English translation (four (4) pages).
Japanese-language Written Opinion (PCT/ISA/237) issued in PCT Application No. PCT/JP2020/027630 dated Aug. 18, 2020 (three (3) pages).

*Primary Examiner* — David J Bolduc
(74) *Attorney, Agent, or Firm* — Crowell & Moring LLP (57) ABSTRACT

A vibration-type angular velocity sensor (100) includes a first angular velocity sensor unit (101) and a second angular velocity sensor unit (102). In a predetermined period, the second angular velocity sensor unit performs a process of detecting an angular velocity based on secondary vibration of a vibrator (11) by a secondary side control circuit (17) and a process of detecting the angular velocity based on the secondary vibration of the vibrator by the primary side control circuit (16) by interchanging functions. The first angular velocity sensor unit detects the angular velocity in the predetermined period. The bias component of the first angular velocity sensor unit is calculated based on a first detection result detected by the first angular velocity sensor unit in the predetermined period and a second detection result detected by the second angular velocity sensor unit in the predetermined period.

14 Claims, 4 Drawing Sheets

VIBRATION-TYPE ANGULAR VELOCITY SENSOR

TECHNICAL FIELD

The present invention relates to a vibration-type angular velocity sensor.

BACKGROUND ART

In the related art, a vibration-type angular velocity sensor is known. For example, it is disclosed in Japanese Unexamined Patent Publication No. 2009-115559.

Japanese Unexamined Patent Publication No. 2009-115559 discloses an angular velocity sensor (vibration-type angular velocity sensor). The angular velocity sensor is disposed with an element portion having a ring shape, and a plurality of electrodes in a circumferential shape on the radial outer side of the element portion having a ring shape. The plurality of electrodes include a primary electrode and a secondary electrode. An AC power supply that generates primary vibration in the element portion having a ring shape is connected to one of the primary electrode and the secondary electrode by applying an AC voltage to one of the primary electrode and the secondary electrode. Further, detection means for detecting the magnitude of an electric signal generated in the other of the primary electrode and the secondary electrode is connected to the other of the primary electrode and the secondary electrode. Then, when rotational motion is generated in the normal direction of the element portion in a state in which the primary vibration is generated in the element portion having a ring shape, secondary vibration according to the angular velocity of the rotational motion is generated in the element portion. Then, the magnitude of the electric signal generated in the other of the primary electrode and the secondary electrode due to the secondary vibration is detected by the detection means connected to the other of the primary electrode and the secondary electrode. Further, the AC voltage for cancelling the secondary vibration is applied to one of the primary electrode and the secondary electrode based on the magnitude of the detected electric signal. Then, the magnitude of the angular velocity is operated based on the magnitude of the AC voltage for cancelling the secondary vibration.

Further, in the vibration-type angular velocity sensor according to the related art as disclosed in Japanese Unexamined Patent Publication No. 2009-115559, the angular velocity detected by the vibration-type angular velocity sensor includes a bias component (an error from a zero point output from a sensor even in a state in which the angular velocity is not added). The bias component is generated due to the asymmetry of a gyro element included in the vibration-type angular velocity sensor. Therefore, the vibration-type angular velocity sensor according to the related art as in Japanese Unexamined Patent Publication No. 2009-115559 is configured to cancel the bias component by switching between the electrode to which the AC power supply is connected (one of the primary electrode and the secondary electrode) and the electrode to which the detection means is connected (the other of the primary electrode and the secondary electrode) and differentiating the outputs of the vibration-type angular velocity sensor before and after being switched in a state in which the angular velocity is set to be constant (in a state in which the vibration-type angular velocity sensor is stopped).

CITATION LIST

Patent Literature

[PTL 1] Japanese Unexamined Patent Publication No. 2009-115559

SUMMARY OF INVENTION

Technical Problem

In the vibration-type angular velocity sensor according to the related art as disclosed in Japanese Unexamined Patent Publication No. 2009-115559, it is necessary to detect an angular velocity in order to cancel the bias component in the state in which the angular velocity is set to be constant (in a state in which the vibration-type angular velocity sensor is stopped), so that it is difficult to detect the angular velocity to cancel the bias component in a state of being moved. Therefore, the vibration-type angular velocity sensor is desired which is capable of cancelling the bias component while continuously detecting the angular velocity in the vibration-type angular velocity sensor which is being moved.

The present invention has been made to solve the above-mentioned problems, and one object of the present invention is to provide a vibration-type angular velocity sensor capable of cancelling a bias component while continuously detecting an angular velocity in the vibration-type angular velocity sensor which is being moved.

Solution to Problem

In order to achieve the above object, according to one aspect of the present invention, there is provided a vibration-type angular velocity sensor including: a first angular velocity sensor unit; and a second angular velocity sensor unit, in which the second angular velocity sensor unit includes a vibrator, a primary side control circuit that has a closed control loop, an output of the closed control loop inducing primary vibration in the vibrator, and a secondary side control circuit that has a closed control loop for detecting secondary vibration generated in the vibrator due to an angular velocity applied to the vibrator, the primary side control circuit and the secondary side control circuit are configured so that a function as the primary side control circuit and a function as the secondary side control circuit are interchangeable, and the second angular velocity sensor unit is configured to perform a process of detecting the angular velocity based on the secondary vibration of the vibrator by the secondary side control circuit in a predetermined period and a process of detecting the angular velocity based on the secondary vibration of the vibrator by the primary side control circuit by interchanging the function of the primary side control circuit and the function of the secondary side control circuit, and the first angular velocity sensor unit is configured to detect the angular velocity in the predetermined period and calculate a bias component of the first angular velocity sensor unit based on a first detection result detected by the first angular velocity sensor unit in the predetermined period and a second detection result detected by the second angular velocity sensor unit in the predetermined period.

As described above, in the vibration-type angular velocity sensor according to one aspect of the present invention, the second angular velocity sensor unit performs the process of detecting the angular velocity based on the secondary vibration of the vibrator by the secondary side control circuit in the predetermined period and the process of detecting the angular velocity based on the secondary vibration of the vibrator by the primary side control circuit by interchanging the function of the primary side control circuit and the function of the secondary side control circuit. Further, the vibration-type angular velocity sensor is configured to detect the angular velocity in the predetermined period by the first angular velocity sensor unit, and to calculate the bias component of the first angular velocity sensor unit based on the first detection result detected by the first angular velocity sensor unit in the predetermined period and the second detection result detected by the second angular velocity sensor unit in the predetermined period. As a result, it is possible to continuously cancel the bias component of the first angular velocity sensor unit using the second detection result calculated by interchanging the function of the primary side control circuit and the function of the secondary side control circuit by the second angular velocity sensor unit while detecting the angular velocity by the first angular velocity sensor unit. As a result, it is possible to cancel the bias component while continuously detecting the angular velocity in the vibration-type angular velocity sensor which is being moved. In addition, even when there is a temperature change in a surrounding environment, it is possible to continuously cancel the bias component due to the temperature change, so that it is possible to accurately cancel the bias component that fluctuates depending on temperature of the surrounding environment.

In the vibration-type angular velocity sensor according to the above one aspect, preferably, a configuration is made so that the bias component of the first angular velocity sensor unit is calculated by subtracting a value of the second detection result detected by the second angular velocity sensor unit in the predetermined period from a value of the first detection result detected by the first angular velocity sensor unit in the predetermined period. With this configuration, it is possible to offset the angular velocity based on actual motion detected by the first angular velocity sensor unit and the angular velocity based on the actual motion detected by the second angular velocity sensor unit, so that it is possible to extract only the bias component even when the angular velocity is not constant. As a result, it is possible to easily calculate the bias component of the first angular velocity sensor unit even when the vibration-type angular velocity sensor is moving (even when the angular velocity is not constant).

In the vibration-type angular velocity sensor according to the above one aspect, preferably, the predetermined period includes a first period in which the process of detecting the angular velocity based on the secondary vibration of the vibrator is performed by the secondary side control circuit, and a second period in which the process of detecting the angular velocity based on the secondary vibration of the vibrator is performed by the primary side control circuit, and the first period and the second period have the same length of time. With this configuration, it is possible to make the period detected by the secondary side control circuit of the second angular velocity sensor unit equal to the period detected by the primary side control circuit of the second angular velocity sensor unit. As a result, it is possible to use the detection result detected by the secondary side control circuit of the second angular velocity sensor unit and the detection result detected by the primary side control circuit of the second angular velocity sensor unit by interchanging the functions to calculate the bias component without performing correction in consideration of the difference between the detection periods.

In the vibration-type angular velocity sensor according to the above one aspect, preferably, the predetermined period is a period in which a bias component of the second angular velocity sensor unit is approximately constant. With this configuration, it is possible to assume that the bias component detected by the secondary side control circuit of the second angular velocity sensor unit and the bias component detected by the primary side control circuit of the second angular velocity sensor unit are approximately the same. Therefore, by subtracting the detection result by the primary side control circuit of the second angular velocity sensor unit from the detection result by the secondary side control circuit of the second angular velocity sensor unit, it is possible to easily cancel the bias component from the second detection result detected by the second angular velocity sensor unit.

In the vibration-type angular velocity sensor according to the above one aspect, preferably, a configuration is made so that the bias component of the first angular velocity sensor unit is calculated based on the first detection result detected by the first angular velocity sensor unit in a first predetermined period and the second detection result detected by the second angular velocity sensor unit in the first predetermined period, and a bias component of the second angular velocity sensor unit is calculated using the angular velocity detected by the second angular velocity sensor unit in a second predetermined period and the bias component of the first angular velocity sensor unit. With this configuration, it is possible to correct the bias component of the first angular velocity sensor unit and the bias component of the second angular velocity sensor unit in the first predetermined period and the second predetermined period, respectively, so that it is possible to improve the accuracy of cancelling the bias component.

In the vibration-type angular velocity sensor according to the above one aspect, preferably, the first angular velocity sensor unit includes a vibrator, a primary side control circuit that has a closed control loop, an output of the closed control loop inducing primary vibration in the vibrator, and a secondary side control circuit that has a closed control loop for detecting secondary vibration generated in the vibrator due to an angular velocity applied to the vibrator, and a function as the primary side control circuit and a function as the secondary side control circuit are respectively fixed to the primary side control circuit and the secondary side control circuit in the first angular velocity sensor unit. With this configuration, it is possible to accurately cancel the bias component of the first angular velocity sensor unit, to which the function as the primary side control circuit and the function as the secondary side control circuit are fixed, using the second angular velocity sensor unit in which the function as the primary side control circuit and the function as the secondary side control circuit are interchangeable.

In the vibration-type angular velocity sensor according to the above one aspect, preferably, the first detection result is an integral value of the angular velocity detected by the first angular velocity sensor unit in the predetermined period, and the second detection result is an integral value of the angular velocity detected by the second angular velocity sensor unit in the predetermined period. With this configuration, unlike the case where the bias component is calculated using the detection result at a certain timing, it is possible to calculate the bias component using the integral value obtained by integrating the detection results in the predetermined period, so that it is possible to level and cancel the noise other than the bias component. As a result, it is possible to more accurately calculate the bias component.

In the vibration-type angular velocity sensor according to the above one aspect, preferably, the vibrator includes a ring-type vibrator. Here, since the ring-type vibrator has a symmetrical shape, a vibration mode by the primary side control circuit and a vibration mode by the secondary side control circuit are similar. Therefore, when the present invention is applied to a vibration-type angular velocity sensor including the ring-type vibrator, it is not necessary to consider the effect of the difference in vibration modes.

Advantageous Effects of Invention

According to the present invention, as described above, it is possible to cancel a bias component while continuously detecting an angular velocity in a vibration-type angular velocity sensor which is being moved.

DESCRIPTION OF EMBODIMENTS

Hereinafter, an embodiment of the present invention will be described with reference to the drawings.

The configuration of a vibration-type angular velocity sensor 100 according to the present embodiment will be described with reference to FIGS. 1 to 4.

Figure 1:
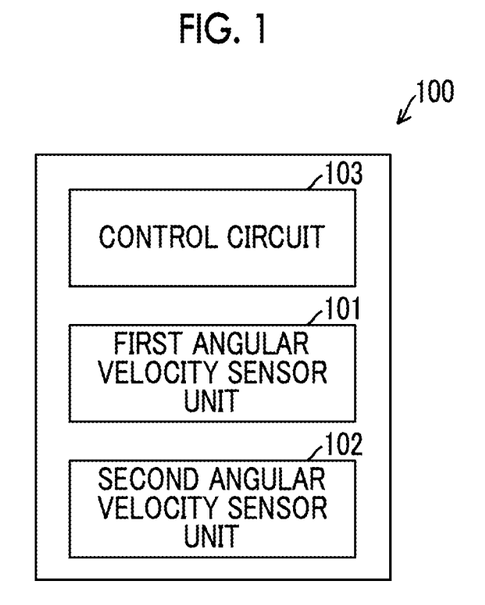
FIG. 1 is a block diagram showing a configuration of a vibration-type angular velocity sensor according to an embodiment.

As shown in FIG. 1, the vibration-type angular velocity sensor 100 includes a first angular velocity sensor unit 101, a second angular velocity sensor unit 102, and a control circuit 103. The first angular velocity sensor unit 101 and the second angular velocity sensor unit 102 are configured to detect an angular velocity around axes parallel to or coaxial with each other.

Figure 2:
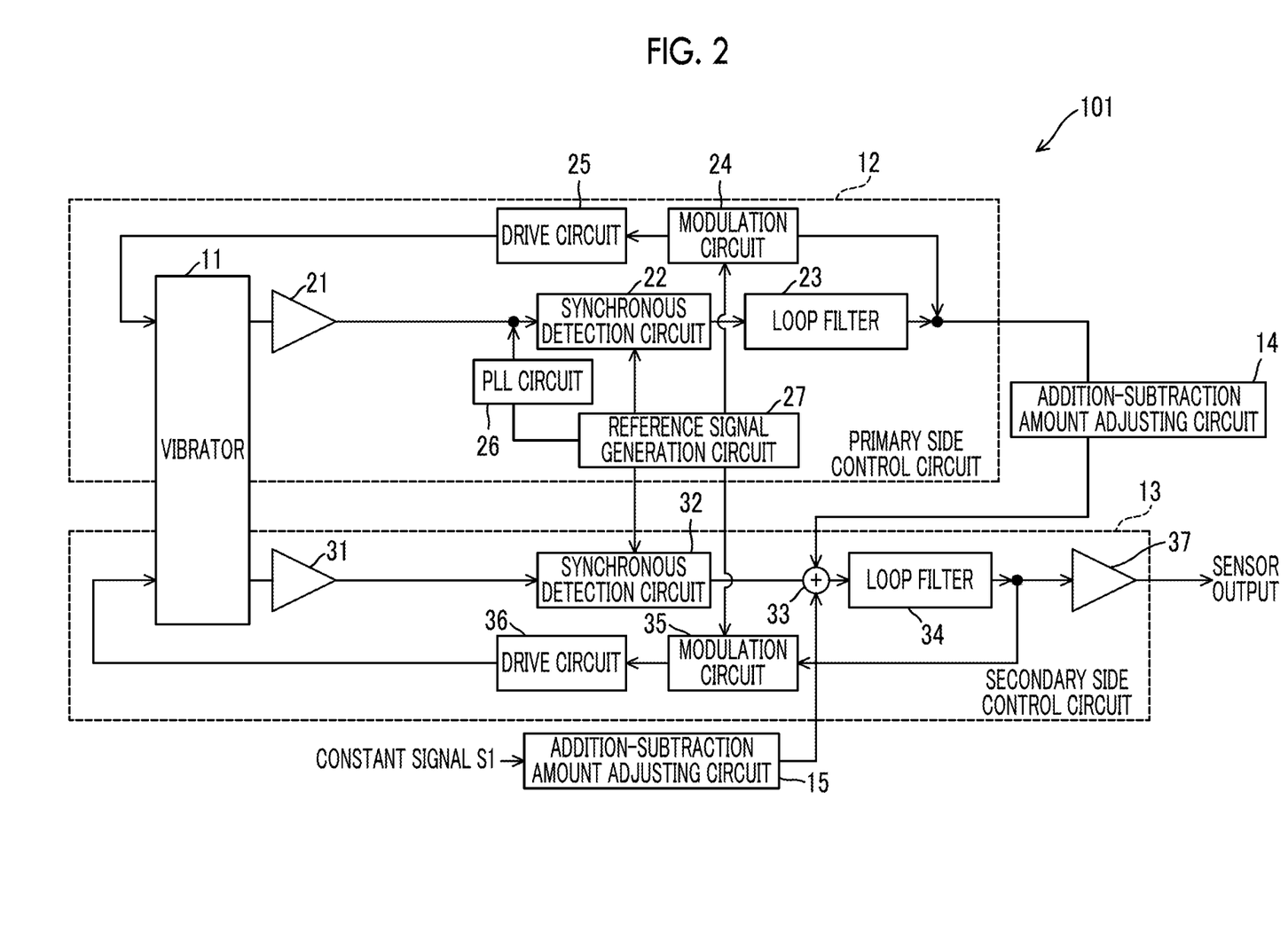
FIG. 2 is a block diagram showing a first angular velocity sensor unit of the vibration-type angular velocity sensor according to the embodiment.

As shown in FIG. 2, the first angular velocity sensor unit 101 includes a vibrator 11, a primary side control circuit 12 that has a closed control loop, the output of the closed control loop inducing primary vibration in the vibrator 11, and a secondary side control circuit 13 that has a closed control loop for detecting secondary vibration generated in the vibrator 11 due to an angular velocity applied to the vibrator 11. The vibrator 11 includes a ring-type vibrator.

The primary side control circuit 12 in the first angular velocity sensor unit 101 includes an amplifier circuit 21, a synchronous detection circuit 22, a loop filter 23, a modulation circuit 24, a drive circuit 25, a Phase Locked Loop (PLL) circuit (phase synchronous circuit) 26, and a reference signal generation circuit 27. Then, the vibrator 11, the amplifier circuit 21, the synchronous detection circuit 22, the loop filter 23, the modulation circuit 24, and the drive circuit 25 are connected in this order to form the closed control loop. The loop filter 23 includes, for example, an integral filter.

The secondary side control circuit 13 in the first angular velocity sensor unit 101 includes an amplifier circuit 31, a synchronous detection circuit 32, an adder circuit 33, a loop filter 34, a modulation circuit 35, a drive circuit 36, and an amplifier circuit 37. Then, the vibrator 11, the amplifier circuit 31, the synchronous detection circuit 32, the adder circuit 33, the loop filter 34, the modulation circuit 35, and the drive circuit 36 are connected in this order to form the closed control loop. The adder circuit 33 is composed of a general addition-subtraction circuit using an operational amplifier. Further, the loop filter 34 includes, for example, an integral filter. Further, the output of the loop filter 34 is input to the amplifier circuit 37. Then, a signal output from the amplifier circuit 37 is output to the outside as the sensor output of the vibration-type angular velocity sensor 100.

Here, in the present embodiment, in each of the primary side control circuit 12 and the secondary side control circuit 13 in the first angular velocity sensor unit 101, a function as the primary side control circuit 12 and a function as the secondary side control circuit 13 are fixed. That is, the primary side control circuit 12 and the secondary side control circuit 13 in the first angular velocity sensor unit 101 are configured so that the function as the primary side control circuit 12 and the function as the secondary side control circuit 13 are not interchangeable.

Further, the first angular velocity sensor unit 101 is provided with an addition-subtraction amount adjusting circuit 14 to which an output from the primary side control circuit 12 (output from the loop filter 23) is input. The addition-subtraction amount adjusting circuit 14 is configured to adjust the magnitude of the output of the loop filter 23 of the primary side control circuit 12 dependent on temperature so that the adjusted output (first offset value) is input to the adder circuit 33 of the secondary side control circuit 13. For example, in the addition-subtraction amount adjusting circuit 14, the addition amount of the first offset value is adjusted by dividing a voltage using a potentiometer (volume resistance) or the like.

Further, the first angular velocity sensor unit 101 is provided with an addition-subtraction amount adjusting circuit 15 to which a constant signal S1 independent of temperature is input. The addition-subtraction amount adjusting circuit 15 is configured to adjust the magnitude of the constant signal S1 so that the adjusted constant signal S1 (second offset value) is input to the adder circuit 33 of the secondary side control circuit 13. For example, in the addition-subtraction amount adjusting circuit 15, the addition amount of the constant signal S1 is adjusted by dividing a voltage using a potentiometer (volume resistance) or the like.

Figure 3:
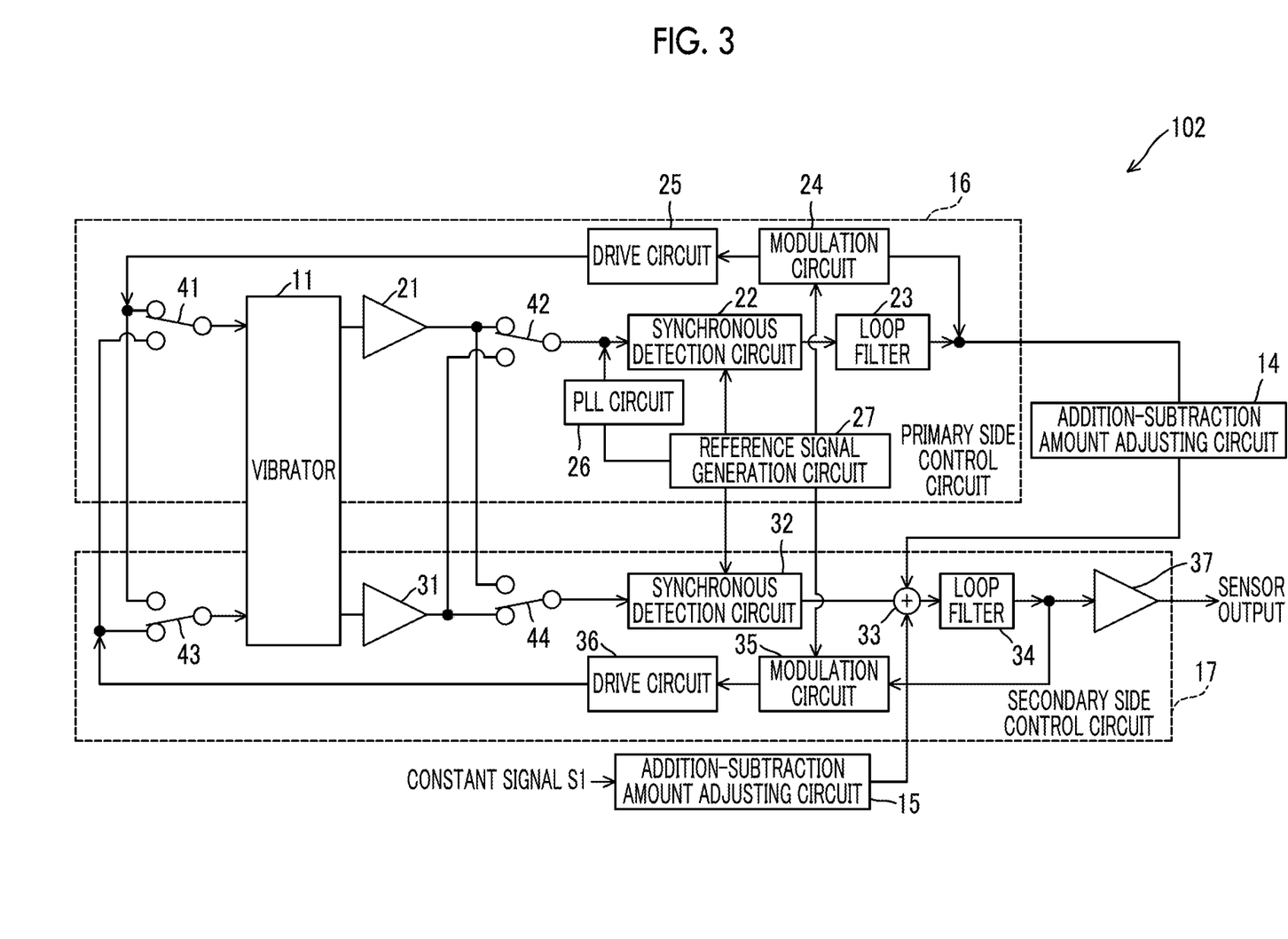
FIG. 3 is a block diagram showing a second angular velocity sensor unit of the vibration-type angular velocity sensor according to the embodiment.

As shown in FIG. 3, the second angular velocity sensor unit 102 includes a vibrator 11, a primary side control circuit 16 that has a closed control loop, the output of the closed control loop inducing primary vibration in the vibrator 11, and a secondary side control circuit 17 that has a closed control loop which detects secondary vibration generated in the vibrator 11 due to the angular velocity applied to the vibrator 11. The vibrator 11 includes a ring-type vibrator. The second angular velocity sensor unit 102 is disposed at a position where a rate of change in temperature is small.

The primary side control circuit 16 of the second angular velocity sensor unit 102 includes an amplifier circuit 21, a synchronous detection circuit 22, a loop filter 23, a modulation circuit 24, a drive circuit 25, a Phase Locked Loop (PLL) circuit (phase synchronous circuit) 26, and a reference signal generation circuit 27. Then, the vibrator 11, the amplifier circuit 21, the synchronous detection circuit 22, the loop filter 23, the modulation circuit 24, and the drive circuit 25 are connected in this order to form the closed control loop. The loop filter 23 includes, for example, an integral filter.

The secondary side control circuit 17 of the second angular velocity sensor unit 102 includes an amplifier circuit 31, a synchronous detection circuit 32, an adder circuit 33, a loop filter 34, a modulation circuit 35, a drive circuit 36, and an amplifier circuit. 37. Then, the vibrator 11, the amplifier circuit 31, the synchronous detection circuit 32, the adder circuit 33, the loop filter 34, the modulation circuit 35, and the drive circuit 36 are connected in this order to form the closed control loop. The adder circuit 33 is composed of a general addition-subtraction circuit using an operational amplifier. Further, the loop filter 34 includes, for example, an integral filter. Further, the output of the loop filter 34 is input to the amplifier circuit 37. Then, a signal output from the amplifier circuit 37 is output to the outside as the sensor output of the vibration-type angular velocity sensor 100.

Here, in the present embodiment, the primary side control circuit 16 and the secondary side control circuit 17 in the second angular velocity sensor unit 102 are configured so that a function as the primary side control circuit 16 and a function as the secondary side control circuit 17 are interchangeable. Specifically, in the primary side control circuit 16, the switch 41 is provided on a signal input side with respect to the vibrator 11 and the switch 42 is provided on a signal output side with respect to the vibrator 11 (the output side of the amplifier circuit 21). Further, in the secondary side control circuit 17, the switch 43 is provided on the signal input side with respect to the vibrator 11 and the switch 44 is provided on the signal output side with respect to the vibrator 11 (the output side of the amplifier circuit 31). The switch 41, the switch 42, the switch 43, and the switch 44 are configured to be able to switch between a state of being connected to the primary side control circuit 16 and a state of being connected to the secondary side control circuit 17, respectively.

In FIG. 3, the switch 41 and the switch 42 show the state of being connected to the primary side control circuit 16, and the switch 43 and the switch 44 show the state of being connected to the secondary side control circuit 17. Further, the switch 41 and the switch 42 are switched so as to be connected to the secondary side control circuit 17, and the switch 43 and the switch 44 are switched so as to be connected to the primary side control circuit 16, so that the function as the primary side control circuit 16 and the function as the secondary side control circuit 17 are interchanged with each other.

Further, the second angular velocity sensor unit 102 is provided with an addition-subtraction amount adjusting circuit 14 to which an output from the primary side control circuit 16 (output from the loop filter 23) is input. The addition-subtraction amount adjusting circuit 14 is configured to adjust the magnitude of the output of the loop filter 23 of the primary side control circuit 16 dependent on temperature so that the adjusted output (first offset value) is input to the adder circuit 33 of the secondary side control circuit 17. For example, in the addition-subtraction amount adjusting circuit 14, the addition amount of the first offset value is adjusted by dividing a voltage using a potentiometer (volume resistance) or the like.

Further, the second angular velocity sensor unit 102 is provided with an addition-subtraction amount adjusting circuit 15 to which a constant signal S1 independent of temperature is input. The addition-subtraction amount adjusting circuit 15 is configured to adjust the magnitude of the constant signal S1 so that the adjusted constant signal S1 (second offset value) is input to the adder circuit 33 of the secondary side control circuit 17. For example, in the addition-subtraction amount adjusting circuit 15, the addition amount of the constant signal S1 is adjusted by dividing a voltage using a potentiometer (volume resistance) or the like.

Figure 4:
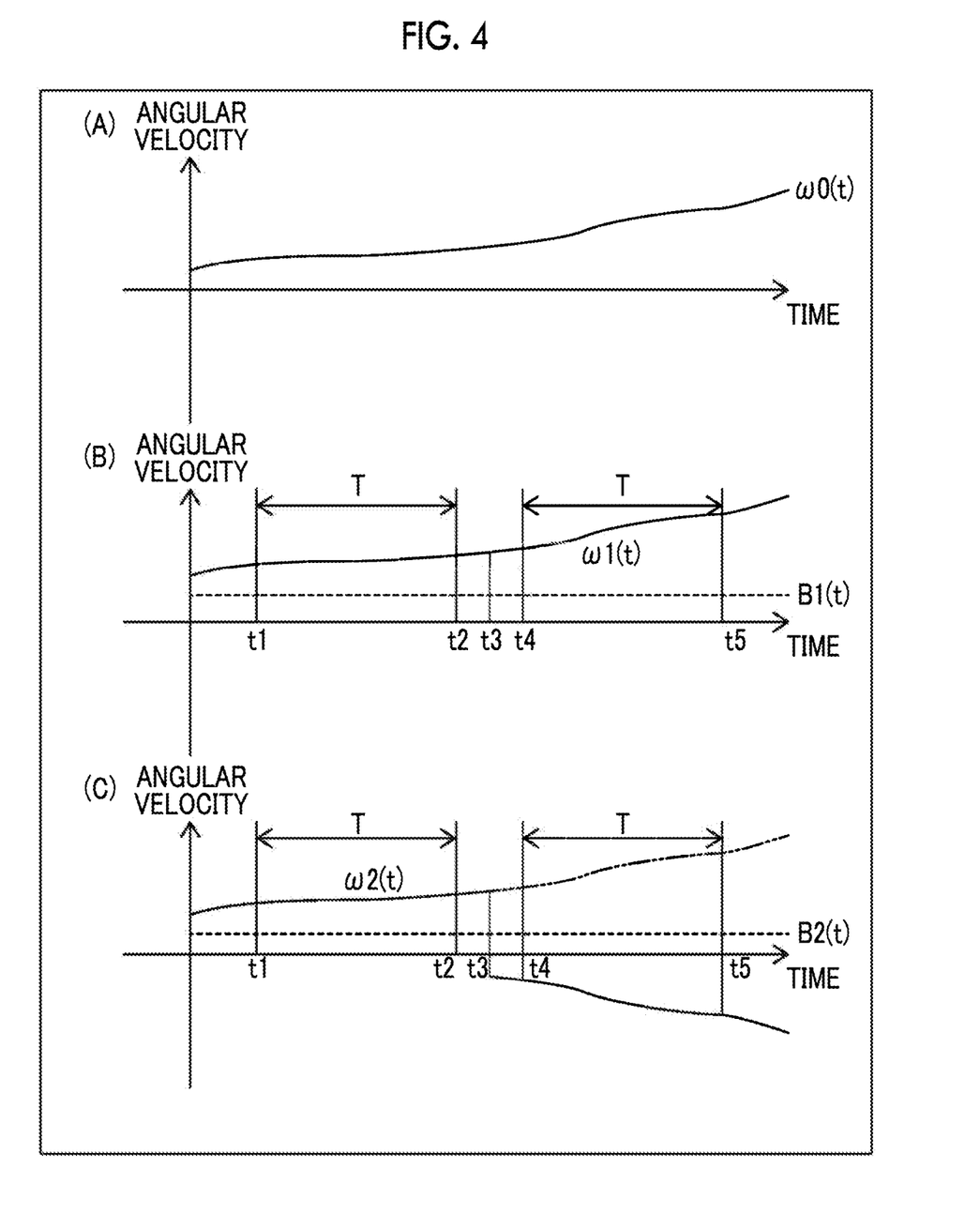
FIG. 4 is a diagram for explaining the calculation of the bias of the vibration-type angular velocity sensor according to the embodiment.

Here, in the present embodiment, the control circuit 103 is configured to perform control so that the second angular velocity sensor unit 102 performs a process of detecting the angular velocity based on the secondary vibration of the vibrator 11 by the secondary side control circuit 17 in a predetermined period and a process of detecting the angular velocity based on the secondary vibration of the vibrator 11 by the primary side control circuit 16 by interchanging a function of the primary side control circuit 16 and the function of the secondary side control circuit 17. Specifically, as shown in FIG. 4(C), in a predetermined period from time t1 to time t2 and from time t4 to time t5, the process of detecting the angular velocity based on the secondary vibration of the vibrator 11 by the secondary side control circuit 17 in the second angular velocity sensor unit 102 and the process of detecting the angular velocity based on the secondary vibration of the vibrator 11 by the primary side control circuit 16 in the second angular velocity sensor unit 102 are performed.

Further, the control circuit 103 is configured to perform control so that the first angular velocity sensor unit 101 performs the process of detecting the angular velocity in the predetermined period. Specifically, as shown in FIG. 4(B), in the predetermined period from time t1 to time t2 and from time t4 to time t5, the process of detecting the angular velocity based on the secondary vibration of the vibrator 11 is performed by the secondary side control circuit 13 in the first angular velocity sensor unit 101.

Further, the control circuit 103 is configured to calculate the bias component (B1(t)) of the first angular velocity sensor unit 101 based on a first detection result detected by the first angular velocity sensor unit 101 in the predetermined period and a second detection result detected by the second angular velocity sensor unit 102 in the predetermined period.

Further, the control circuit 103 is configured to calculate the bias component of the first angular velocity sensor unit 101 by subtracting the value of the second detection result detected by the second angular velocity sensor unit 102 in the predetermined period from the value of the first detection result detected by the first angular velocity sensor unit 101 in the predetermined period.

Note that, the predetermined period includes a first period (the period from time t1 to time t2) in which the process of detecting the angular velocity based on the secondary vibration of the vibrator 11 is performed by the secondary side control circuit 17, and a second period (the period from time t4 to time t5) in which the process of detecting an angular velocity based on the secondary vibration of the vibrator 11 is performed by the primary side control circuit 16. Further, the first period and the second period have the same length of time. As shown in FIG. 4, each of the first period and the second period has a length of time T.

The first detection result is an integral value of the angular velocity detected by the first angular velocity sensor unit 101 in the predetermined period. The second detection result is an integral value of the angular velocity detected by the second angular velocity sensor unit 102 in the predetermined period.

Further, the predetermined period is a period in which the bias component of the second angular velocity sensor unit 102 is approximately constant. For example, the predetermined period has a length of about several seconds to several tens of seconds. Further, the predetermined period is a period in which it is possible to ignore the influence of the temperature change and it is possible to assume that the bias component of the second angular velocity sensor unit 102 does not change approximately.

The integral value I1 of the first detection result in the predetermined period (the first period from time t1 to time t2 and the second period from time t4 to time t5 shown in FIG. 4(B) is expressed as in Equation (1).

$$I1 = \int_{t1}^{t2} \omega1(t)dt + \int_{t4}^{t5} \omega1(t)dt \qquad \text{Equation (1)}$$

However, the angular velocity ω1(t) detected by the secondary side control circuit 13 in the first angular velocity sensor unit 101 is expressed as in Equation (2) using the angular velocity (true angular velocities) ω0(t) generated by motion (movement) shown in FIG. 4(A) and the bias B1(t) of the first angular velocity sensor unit 101.

$$\omega1(t) = \omega0(t) + B1(t) \qquad \text{Equation (2)}$$

Therefore, Equation (1) is derived as in Equation (3).

$$I1 = \int_{t1}^{t2} (\omega0(t) + B1(t))dt + \int_{t4}^{t5} (\omega0(t) + B1(t))dt$$

$$I1 = \int_{t1}^{t2} \omega0(t)dt + \int_{t1}^{t2} B1(t)dt + \int_{t4}^{t5} \omega0(t)dt + \int_{t4}^{t5} B1(t)dt \qquad \text{Equation (3)}$$

Further, an integral value I2 of the second detection result in the predetermined period (the first period from time t1 to time t2 and the second period from time t4 to time t5) shown in FIG. 4(C) is expressed as in Equation (4).

$$I2 = \int_{t1}^{t2} \omega2(t)dt - \int_{t4}^{t5} \omega2(t)dt \qquad \text{Equation (4)}$$

In the second period from time t4 to time t5, the integral value is subtracted in consideration of a fact that ω2(t) is reversed with respect to the bias component.

The angular velocity ω2(t) detected by the secondary side control circuit 17 in the second angular velocity sensor unit 102 and the angular velocity ω2(t) detected by the primary side control circuit 16 are expressed as in Equation (5) and Equation (6), respectively, using the angular velocity (true angular velocity) ω0(t) generated by the motion (movement) shown in FIG. 4(A) and the bias B2(t) of the second angular velocity sensor unit 102.

$$\omega2(t) = \omega0(t) + B2(t) \qquad \text{Equation (5)}$$

$$\omega2(t) = -\omega0(t) + B2(t) \qquad \text{Equation (6)}$$

Note that, in Equation (6) of the second period from time t4 to time t5, ω0(t) is reversed with respect to the bias component, so that a minus is applied.

Therefore, Equation (4) is derived as in Equation (7).

$$I2 = \int_{t1}^{t2} (\omega0(t) + B2(t))dt - \int_{t4}^{t5} (-\omega0(t) + B2(t))dt$$

$$I2 = \int_{t1}^{t2} \omega0(t)dt + \int_{t1}^{t2} B2(t)dt + \int_{t4}^{t5} \omega0(t)dt - \int_{t4}^{t5} B2(t)dt \qquad \text{Equation (7)}$$

When the integral value I2 of the second detection result is subtracted from the integral value I1 of the first detection result, Equation is derived as in Equation (8).

$$I1 - I2 = \int_{t1}^{t2} \omega0(t)dt + \int_{t1}^{t2} B1(t)dt + \int_{t4}^{t5} \omega0(t)dt + \int_{t4}^{t5} B1(t)dt - \int_{t1}^{t2} \omega0(t)dt - \int_{t1}^{t2} B2(t)dt - \int_{t4}^{t5} \omega0(t)dt + \int_{t4}^{t5} B2(t)dt$$

$$I1 - I2 = \int_{t1}^{t2} B1(t)dt + \int_{t4}^{t5} B1(t)dt + \int_{t1}^{t2} B2(t)dt - \int_{t4}^{t5} B2(t)dt \qquad \text{Equation (8)}$$

Here, in the first period from time t1 to time t2 and the second period from time t4 to time t5, the amount of change over time of each of the bias B1(t) of the first angular velocity sensor unit 101 and the bias B2(t) of the second angular velocity sensor unit 102 is negligible (constant), it can be assumed that Equation (9) and Equation (10) is hold.

$$\int_{t1}^{t2} B1(t)dt = \int_{t4}^{t5} B1(t)dt = B1*T \qquad \text{Equation (9)}$$

$$\int_{t1}^{t2} B2(t)dt = \int_{t4}^{t5} B2(t)dt = B2*T \qquad \text{Equation (10)}$$

However, B1 is the bias value of the first angular velocity sensor unit 101 in the first period and the second period, and B2 is the bias value of the second angular velocity sensor unit 102 in the first period and the second period.

Therefore, Equation (11) is derived from Equation (8).

$$I1 - I2 = 2*B1*T \qquad \text{Equation (11)}$$

Since T is known, the bias value B1 of the first angular velocity sensor unit 101 is calculated by dividing (I1−I2) by 2T. The calculated bias value B1 is used for angular velocity detection by the first angular velocity sensor unit 101. For example, the bias value B1 is used as an observation update of the Kalman filter.

Note that, the relationship between Equation (9) and Equation (10) may be hold in the period during which the control is performed for interchanging the function of the primary side control circuit 16 and the function of the secondary side control circuit 17 in the second angular velocity sensor unit 102 and the angular velocity is measured to calculate the bias value B1. Therefore, for example, even when a time interval (t6−t5) up to time t6, which is the start point of a next process, is large and B1 changes, similarly, correction is possible by process from next time t6. However, in order to always make the change in B1 small, it is preferable to make the time interval (t6−t5) sufficiently small.

Here, there is a case where the relationship of Equation (10) may not be hold in the period during which the control is performed for interchanging the function as the primary side control circuit 16 and the function as the secondary side control circuit 17 in the second angular velocity sensor unit 102 and the angular velocity is measured to calculate the bias value B1. That is, there is a case where Equation (12) is hold.

$$\int_{t1}^{t2} B2(t)dt - \int_{t4}^{t5} B2(t)dt = \alpha (\neq 0) \qquad \text{Equation (12)}$$

Even in this case, at the start of operation (at the start of movement), α is added, and the bias components are mutually corrected using the two first angular velocity sensor unit 101 and the second angular velocity sensor unit 102, so that it is possible to cope with the time change of the bias components (B2(t)).

That is, the control circuit 103 calculates the bias component of the first angular velocity sensor unit 101 based on the first detection result detected by the first angular velocity sensor unit 101 in a first predetermined period and the second detection result detected by the second angular velocity sensor unit 102 in the first predetermined period. Further, the control circuit 103 calculates the bias component of the second angular velocity sensor unit 102 by using the angular velocity detected by the second angular velocity sensor unit 102 in the second predetermined period and the bias component of the first angular velocity sensor unit 101. Then, the control circuit 103 alternately repeats the controls. That is, the bias component B1 of the first angular velocity sensor unit 101 is corrected by calculating the first bias component. In the next cycle, α of B2, which is the bias component of the second angular velocity sensor unit 102, is calculated using the corrected B1. Then, in the further next cycle, B1, which is the bias component of the first angular velocity sensor unit 101, is corrected using the corrected α. After that, the processes are alternately repeated.

Note that, before the start of movement at the start of operation, α is obtained in a stationary state (a state in which the angular velocity ω0(t) is constant), and then α (t) may be sequentially corrected as described above.

Effect of Present Embodiment

In the present embodiment, the following effects can be obtained.

In the present embodiment, as described above, the second angular velocity sensor unit 102 performs the process of detecting the angular velocity based on the secondary vibration of the vibrator 11 by the secondary side control circuit 17 in the predetermined period and the process of detecting the angular velocity based on the secondary vibration of the vibrator 11 by the primary side control circuit 16 by interchanging the function of the primary side control circuit 16 and the function of the secondary side control circuit 17. Further, the vibration-type angular velocity sensor 100 is configured to detect the angular velocity in the predetermined period by the first angular velocity sensor unit 101, and to calculate the bias component of the first angular velocity sensor unit 101 based on the first detection result detected by the first angular velocity sensor unit 101 in the predetermined period and the second detection result detected by the second angular velocity sensor unit 102 in the predetermined period. As a result, it is possible to continuously cancel the bias component of the first angular velocity sensor unit 101 using the second detection result calculated by interchanging the function of the primary side control circuit 16 and the function of the secondary side control circuit 17 by the second angular velocity sensor unit 102 while detecting the angular velocity by the first angular velocity sensor unit 101. As a result, it is possible to cancel the bias component while continuously detecting the angular velocity in the vibration-type angular velocity sensor 100 which is being moved. In addition, even when there is a temperature change in a surrounding environment, it is possible to continuously cancel the bias component due to the temperature change, so that it is possible to accurately cancel the bias component that fluctuates depending on temperature of the surrounding environment.

Further, in the present embodiment, as described above, a configuration is made so as to calculate the bias component of the first angular velocity sensor unit 101 by subtracting the value of the second detection result detected by the second angular velocity sensor unit 102 in the predetermined period from the value of the first detection result detected by the first angular velocity sensor unit 101 in the predetermined period. As a result, it is possible to offset the angular velocity based on the actual motion detected by the first angular velocity sensor unit 101 and the angular velocity based on the actual motion detected by the second angular velocity sensor unit 102, so that it is possible to extract only the bias component even though the angular velocity is not constant. As a result, it is possible to easily calculate the bias component of the first angular velocity sensor unit 101 even when the vibration-type angular velocity sensor 100 is moving (even when the angular velocity is not constant).

Further, in the present embodiment, as described above, the predetermined period includes the first period in which the process of detecting the angular velocity based on the secondary vibration of the vibrator 11 is performed by the secondary side control circuit 17, and the second period in which the process of detecting the angular velocity based on the secondary vibration of the vibrator 11 is performed by the primary side control circuit 16, and the first period and the second period have the same length of time. As a result, it is possible to make the period detected by the secondary side control circuit 17 in the second angular velocity sensor unit 102 equal to the period detected by the primary side control circuit 16 in the second angular velocity sensor unit 102. As a result, it is possible to use the detection result detected by the secondary side control circuit 17 in the second angular velocity sensor unit 102 and the detection result detected by the primary side control circuit 16 in the second angular velocity sensor unit 102 by interchanging the functions to calculate the bias component without performing correction in consideration of the difference between the detection periods.

Further, in the present embodiment, as described above, the predetermined period is a period in which the bias component of the second angular velocity sensor unit 102 is approximately constant. As a result, it is possible to assume that the bias component detected by the secondary side control circuit 17 in the second angular velocity sensor unit 102 and the bias component detected by the primary side control circuit 16 in the second angular velocity sensor unit 102 are approximately the same. Therefore, by subtracting the detection result by the primary side control circuit 16 in the second angular velocity sensor unit 102 from the detection result by the secondary side control circuit 17 in the second angular velocity sensor unit 102, it is possible to easily cancel the bias component from the second detection result detected by the second angular velocity sensor unit 102.

Further, in the present embodiment, as described above, the bias component of the first angular velocity sensor unit 101 is calculated based on the first detection result detected by the first angular velocity sensor unit 101 in the first predetermined period and the second detection result detected by the second angular velocity sensor unit 102 in the first predetermined period. Further, the bias component of the second angular velocity sensor unit 102 is calculated by using the angular velocity detected by the second angular velocity sensor unit 102 in the second predetermined period and the bias component of the first angular velocity sensor unit 101. As a result, it is possible to correct the bias component of the first angular velocity sensor unit 101 and the bias component of the second angular velocity sensor unit 102 in the first predetermined period and the second predetermined period, respectively, so that it is possible to improve the accuracy of cancelling the bias component.

Further, in the present embodiment, as described above, the function as the primary side control circuit 12 and the function as the secondary side control circuit 13 are respectively fixed to the primary side control circuit 12 and the secondary side control circuit 13 in the first angular velocity sensor unit 101. As a result, it is possible to accurately cancel the bias component of the first angular velocity sensor unit 101, to which the function as the primary side control circuit 12 and the function as the secondary side control circuit 13 are fixed, by using the second angular velocity sensor unit 102 in which the function as the primary side control circuit 16 and the function as the secondary side control circuit 17 are interchangeable.

Further, in the present embodiment, as described above, the first detection result is the integral value of the angular velocity detected by the first angular velocity sensor unit 101 in the predetermined period, and the second detection result is the integral value of the angular velocity detected by the second angular velocity sensor unit 102 in the predetermined period. As a result, unlike the case where the bias component is calculated using the detection result at a certain timing, it is possible to calculate the bias component using the integral value obtained by integrating the detection results in the predetermined period, so that it is possible to level and cancel the noise other than the bias component. As a result, it is possible to more accurately calculate the bias component.

Further, in the present embodiment, as described above, the vibrator 11 includes a ring-type vibrator. Here, since the ring-type vibrator has a symmetrical shape, a vibration mode by the primary side control circuit 16 and a vibration mode by the secondary side control circuit 17 are similar. As a result, it is not necessary to consider the effect of the difference in the vibration mode of the vibration-type angular velocity sensor 100 including the ring-type vibrator 11.

MODIFICATION EXAMPLE

Note that, it should be noted that the embodiments disclosed this time are exemplary in all aspects and are not restrictive. The scope of the present invention is shown by the claims rather than the description of the embodiment described above, and further includes all modifications within the meaning and scope equivalent to the claims.

For example, in the embodiment, an example in which the ring-type vibrator is used is shown, but the present invention is not limited thereto. For example, the vibrator may have a symmetrical shape, and a vibrator having a disk type, a cup type (wine glass type), an octagonal type, or the like may be used.

Further, in the embodiment, an example in which the closed control loop is configured by the vibrator, the amplifier circuit, the synchronous detection circuit, the loop filter, the modulation circuit, and the drive circuit is shown, but the present invention is not limited thereto. For example, the control loop may be configured by a configuration other than the configuration consisting of the amplifier circuit, the synchronous detection circuit, the loop filter, the modulation circuit, and the drive circuit.

Further, in the embodiment, an example in which an integral filter is used as the loop filter is shown, but for example, a loop filter other than the integral filter may be used.

Further, in the embodiment, an example of a configuration in which the function of the primary side control circuit and the function of the secondary side control circuit in the first angular velocity sensor unit are fixed is shown, but the present invention is not limited thereto. In the present invention, similar to the second angular velocity sensor unit, the function of the primary side control circuit and the function of the secondary side control circuit may be interchangeable in the first angular velocity sensor unit.

Further, in the embodiment, an example of a configuration in which the vibration-type angular velocity sensor is provided with two angular velocity sensor units, a first angular velocity sensor unit and a second angular velocity sensor unit, has been shown, but the present invention is not limited thereto. In the present invention, the vibration-type angular velocity sensor may be provided with three or more angular velocity sensor units.

REFERENCE SIGNS LIST

11 Vibrator
12, 16 Primary side control circuit
13, 17 Secondary side control circuit
100 Vibration-type angular velocity sensor
101 First angular velocity sensor unit
102 Second angular velocity sensor unit

The invention claimed is:

1. A vibration-type angular velocity sensor comprising:
a first angular velocity sensor unit; and
a second angular velocity sensor unit, wherein
the second angular velocity sensor unit includes
a vibrator,
a primary side control circuit that has a closed control loop, an output of the closed control loop inducing primary vibration in the vibrator, and
a secondary side control circuit that has a closed control loop for detecting secondary vibration generated in the vibrator due to an angular velocity applied to the vibrator,
the primary side control circuit and the secondary side control circuit are configured so that a function as the primary side control circuit and a function as the secondary side control circuit are interchangeable,
the second angular velocity sensor unit is configured to perform a process of detecting an angular velocity based on the secondary vibration of the vibrator by the secondary side control circuit in a predetermined period and a process of interchanging the function of the primary side control circuit and the function of the secondary side control circuit and detecting an angular velocity based on the secondary vibration of the vibrator by the primary side control circuit,
the first angular velocity sensor unit is configured to detect the angular velocity in the predetermined period and
the vibration-type angular velocity sensor is configured to calculate a bias component of the first angular velocity sensor unit based on a first detection result detected by the first angular velocity sensor unit in the predetermined period and a second detection result detected by the second angular velocity sensor unit in the predetermined period.

2. The vibration-type angular velocity sensor according to claim 1,
wherein
a configuration is made so that the bias component of the first angular velocity sensor unit is calculated by subtracting a value of the second detection result detected by the second angular velocity sensor unit in the predetermined period from a value of the first detection result detected by the first angular velocity sensor unit in the predetermined period.

3. The vibration-type angular velocity sensor according to claim 1, wherein
the predetermined period includes a first period in which the process of detecting the angular velocity based on the secondary vibration of the vibrator is performed by the secondary side control circuit, and a second period in which the process of detecting the angular velocity based on the secondary vibration of the vibrator is performed by the primary side control circuit, and
the first period and the second period have the same length of time.

4. The vibration-type angular velocity sensor according to claim 1, wherein
the predetermined period is a period in which a bias component of the second angular velocity sensor unit is approximately constant.

5. The vibration-type angular velocity sensor according to claim 1, wherein a configuration is made so that the bias component of the first angular velocity sensor unit is calculated based on the first detection result detected by the first angular velocity sensor unit in a first predetermined period and the second detection result detected by the second angular velocity sensor unit in the first predetermined period, and a bias component of the second angular velocity sensor unit is calculated using the angular velocity detected by the second angular velocity sensor unit in a second predetermined period and the bias component of the first angular velocity sensor unit.

6. The vibration-type angular velocity sensor according to claim 1, wherein
the first angular velocity sensor unit includes
a vibrator,
a primary side control circuit that has a closed control loop, an output of the closed control loop inducing primary vibration in the vibrator, and
a secondary side control circuit that has a closed control loop for detecting secondary vibration generated in the vibrator due to an angular velocity applied to the vibrator, and
a function as the primary side control circuit and a function as the secondary side control circuit are respectively fixed to the primary side control circuit and the secondary side control circuit in the first angular velocity sensor unit.

7. The vibration-type angular velocity sensor according to claim 1, wherein
the first detection result is an integral value of the angular velocity detected by the first angular velocity sensor unit in the predetermined period, and
the second detection result is an integral value of the angular velocity detected by the second angular velocity sensor unit in the predetermined period.

8. The vibration-type angular velocity sensor according to claim 1, wherein
the vibrator includes a ring-type vibrator.

9. A vibration-type angular velocity sensor comprising:
a first angular velocity sensor unit; and
a second angular velocity sensor unit, wherein
the second angular velocity sensor unit includes
a vibrator,
a primary side control circuit that has a closed control loop, an output of the closed control loop inducing primary vibration in the vibrator, and
a secondary side control circuit that has a closed control loop for detecting secondary vibration generated in the vibrator due to an angular velocity applied to the vibrator, wherein
a configuration is made so that a function of inducing the primary vibration and a function of detecting the secondary vibration are interchangeable, and
the second angular velocity sensor unit is configured to perform a process of detecting the angular velocity based on the secondary vibration of the vibrator in a predetermined period and a process of interchanging the function of inducing the primary vibration and the function of detecting the secondary vibration and detecting the angular velocity based on the secondary vibration of the vibrator, the first angular velocity sensor unit is configured to detect the angular velocity in the predetermined period and
the vibration-type angular velocity sensor is configured to calculate a bias component of the first angular velocity sensor unit based on a first detection result detected by the first angular velocity sensor unit in the predetermined period and a second detection result detected by the second angular velocity sensor unit in the predetermined period.

10. The vibration-type angular velocity sensor according to claim 9, wherein
a configuration is made so that the bias component of the first angular velocity sensor unit is calculated by subtracting a value of the second detection result detected by the second angular velocity sensor unit in the predetermined period from a value of the first detection result detected by the first angular velocity sensor unit in the predetermined period.

11. The vibration-type angular velocity sensor according to claim 9, wherein
the predetermined period is a period in which a bias component of the second angular velocity sensor unit is approximately constant.

12. The vibration-type angular velocity sensor according claim 9, wherein
a configuration is made so that the bias component of the first angular velocity sensor unit is calculated based on the first detection result detected by the first angular velocity sensor unit in a first predetermined period and the second detection result detected by the second angular velocity sensor unit in the first predetermined period, and a bias component of the second angular velocity sensor unit is calculated using the angular velocity detected by the second angular velocity sensor unit in a second predetermined period and the bias component of the first angular velocity sensor unit.

13. The vibration-type angular velocity sensor according to claim 9, wherein
the first angular velocity sensor unit includes
a vibrator,
a primary side control circuit that has a closed control loop, an output of the closed control loop inducing primary vibration in the vibrator, and
a secondary side control circuit that has a closed control loop for detecting secondary vibration generated in the vibrator due to an angular velocity applied to the vibrator, and
a function of inducing the primary vibration and a function of detecting the secondary vibration are respectively fixed to the primary side control circuit and the secondary side control circuit in the first angular velocity sensor unit.

14. The vibration-type angular velocity sensor according to claim 9, wherein
the first detection result is an integral value of the angular velocity detected by the first angular velocity sensor unit in the predetermined period, and
the second detection result is an integral value of the angular velocity detected by the second angular velocity sensor unit in the predetermined period.

* * * * *